F. CARLSON.
PUSHING DEVICE FOR MOTOR VEHICLES.
APPLICATION FILED JUNE 24, 1919.
1,378,321.
Patented May 17, 1921.
3 SHEETS—SHEET 1.
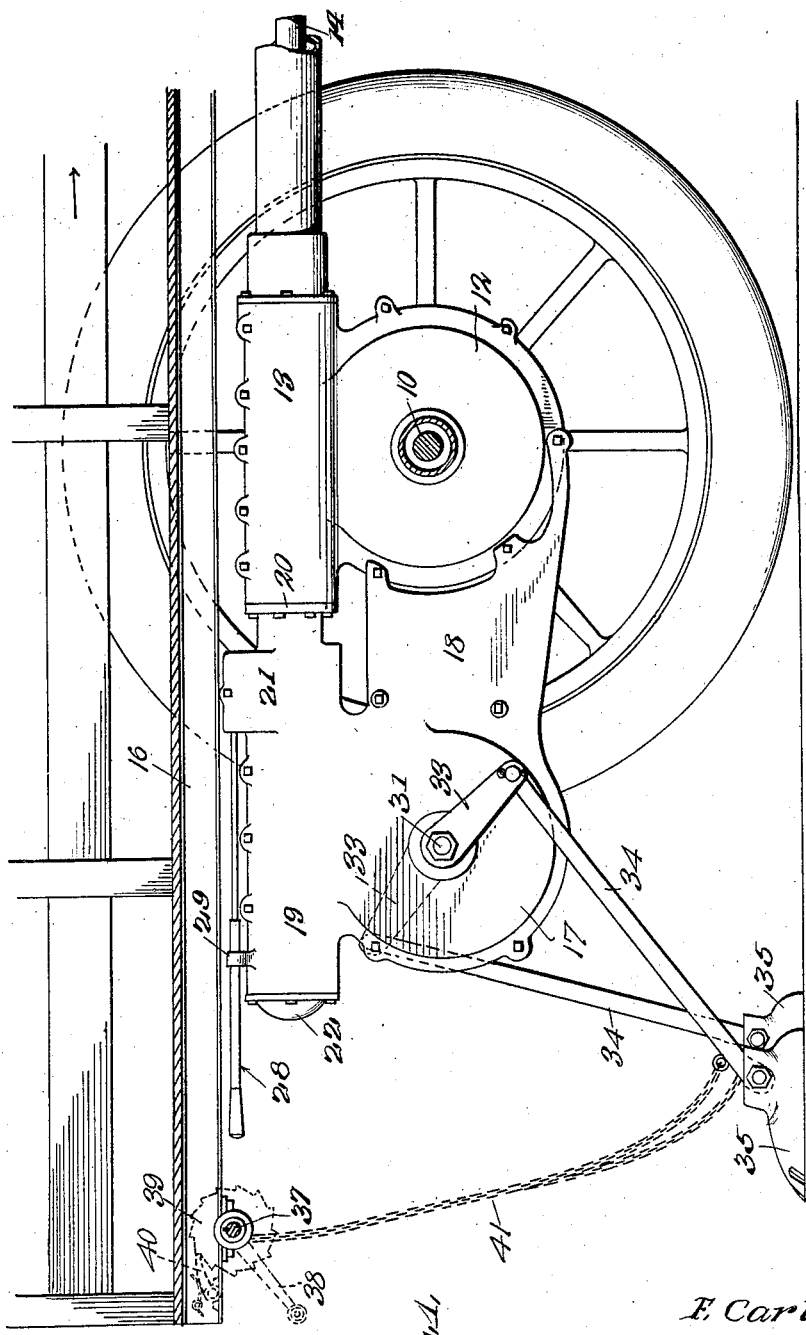
Inventor
F. Carlson,
By
Lacey & Lacey, Attorneys

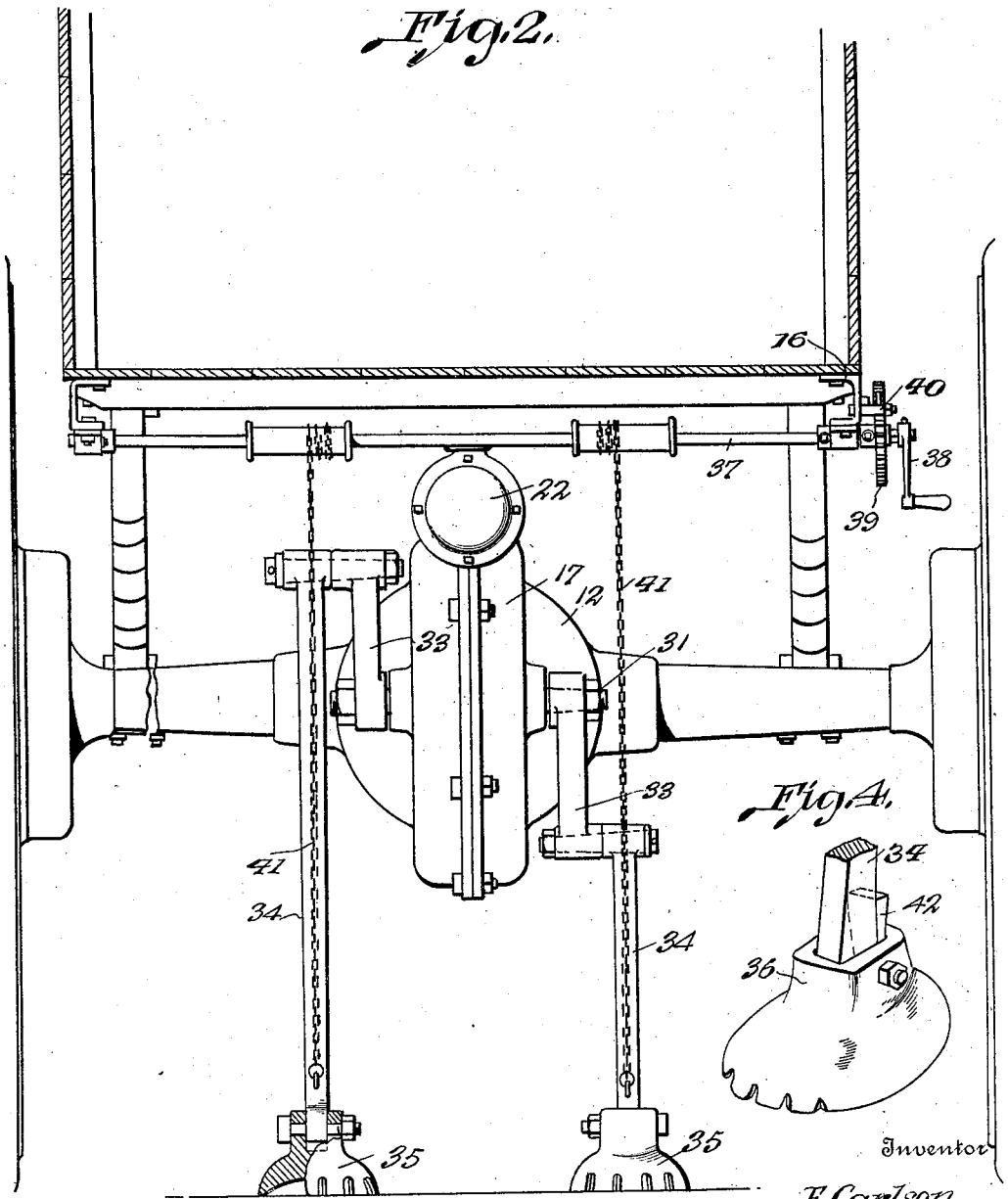

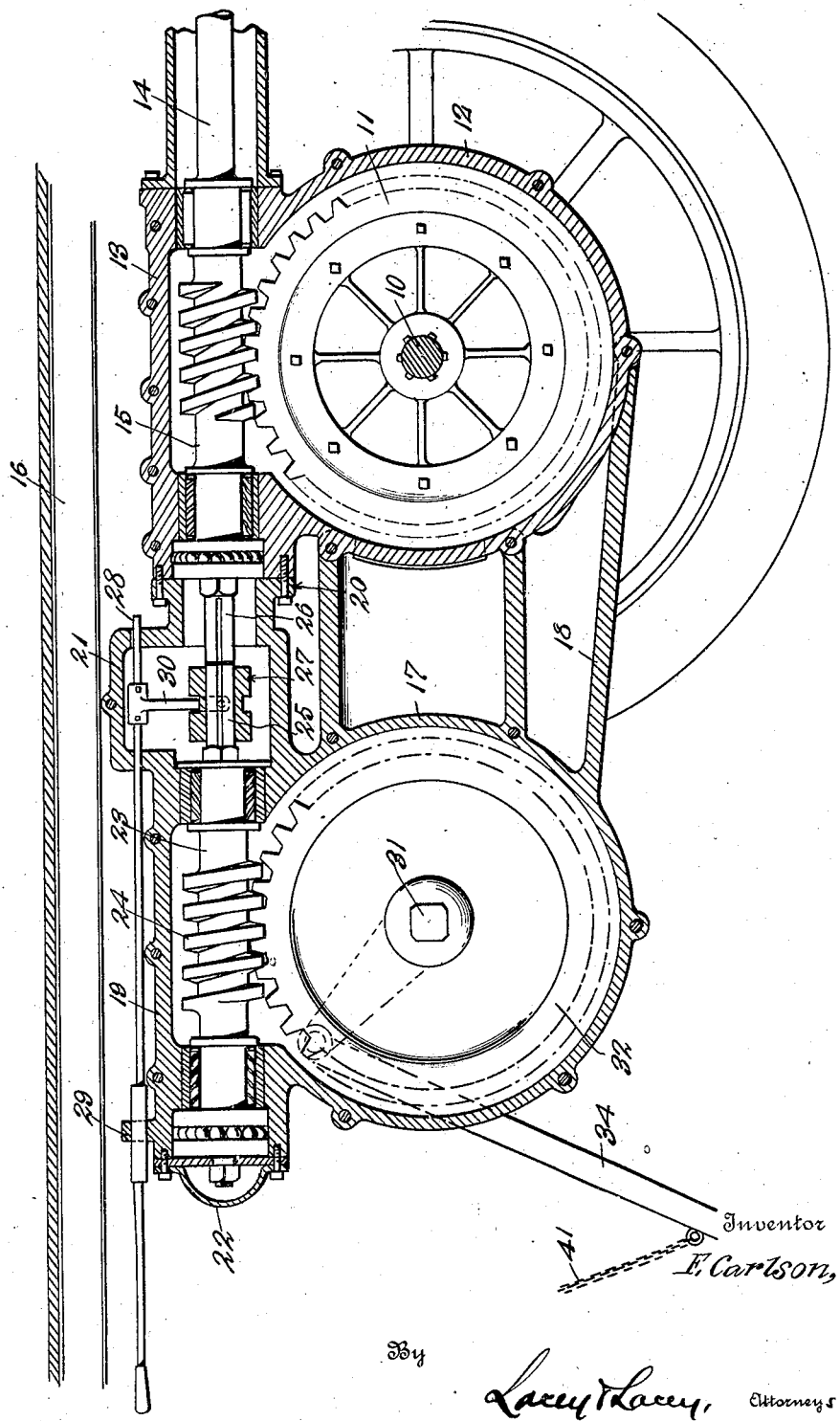

UNITED STATES PATENT OFFICE.

FRITUFF CARLSON, OF DETROIT, MICHIGAN.

PUSHING DEVICE FOR MOTOR-VEHICLES.

1,378,321.  Specification of Letters Patent.  Patented May 17, 1921.

Application filed June 24, 1919. Serial No. 306,440.

*To all whom it may concern:*

Be it known that I, FRITUFF CARLSON, citizen of the United States, residing at Detroit, in the county of Wayne and State of Michigan, have invented certain new and useful Improvements in Pushing Devices for Motor-Vehicles, of which the following is a specification.

This invention relates to an improved pushing device for motor vehicles, being particularly designed for use in connection with trucks or other heavy vehicles of similar nature, and has as one of its principal objects to provide a device whereby, when a truck becomes stalled, the motive power of the truck may be employed for pushing the truck ahead and thus extricating the truck.

The invention has as a further object to provide a device which may be attached directly to the differential housing of the truck and which when desired, may be coupled to the propeller shaft of the truck for thus actuating the device by the truck motor.

A still further object of the invention is to provide a device which will be worm driven so that maximum results may be obtained from the motive power of the truck.

A further object of the invention is to provide a device employing ground engaging shoes and wherein, when the device is in operation, the shoes will be alternately carried forwardly step by step to engage the ground for thus pushing the truck ahead.

A further object of the invention is to provide a device wherein the ground engaging shoes may normally be supported elevated in inoperative position.

And the invention has as a still further object to provide a device which may be readily applied to conventional trucks of different types.

Other and incidental objects will appear hereinafter. In the accompanying drawings:

Figure 1 is a side elevation showing my improved device applied to a conventional type of motor truck, Fig. 2 is a rear elevation of the device, Fig. 3 is a longitudinal sectional view more particularly illustrating the structural details of the device, and Fig. 4 is a fragmentary perspective view showing one of the ground engaging shoes of the device in detail.

In order that the construction, mounting and operation of my device may be accurately understood, I have, in the drawings, shown the device in connection with a conventional type of truck. The rear axle of the truck is indicated at 10 and coupled with this axle is the worm wheel 11 of the differential which is inclosed within the usual differential housing 12. At its upper side this housing is formed with a barrel 13 and entering this barrel is the propeller shaft 14 of the truck provided at its rear end portion with a worm 15 journaled in the barrel and meshing with the worm wheel 11. The frame of the truck chassis is indicated at 16.

In carrying the invention into effect, I employ a vertically split casing 17 provided at its forward side with an extension 18 which is bolted or otherwise secured to the rear side of the differential housing 12 of the truck. In any instance where the device is installed upon a truck at the time of its original manufacture, the casing of the present device may be formed integral with the differential housing. At its upper side, the housing 17 is provided with a barrel 19 extending in alinement with the barrel 13 upon the housing 12 and provided at its forward end with a flange 20 mating with and closing the rear end of the barrel 13 to which it is bolted or otherwise secured. Near its forward end the barrel 19 is provided with an enlarged portion 21 while, at its outer end the barrel is closed by a cap 22. Journaled within the barrel upon suitable bearings arranged therein is a worm shaft 23. This shaft is provided with a worm 24 and, at its forward end, is formed with a reduced extension 25 projecting into the enlarged portion 21 of the barrel. At its rear end the propeller shaft 14 is also provided with a reduced extension 26 which, like the extension 25, extends into the portion 21 of the barrel 19 and registers with the extension 25. Splined on the extension 25 is a coupling sleeve 27 and, as will be observed upon reference to Fig. 3, the extension 26 is slotted to receive the key of this sleeve. However, the sleeve normally rests wholly upon the extension 25. Slidable through the enlarged portion 21 of the barrel is a shifting rod 28 freely received at its outer end portion through a guide 29 upstanding from the barrel near its outer end. Fixed to said rod within the portion 21 of the barrel is a shifting fork 30 freely engaging the sleeve 27. Thus, as will now be clear, the rod 28 may be manually moved forwardly for shifting the sleeve 29 to a position engaging with the extension 26 of the propeller shaft as well as with the extension 25 of the worm shaft for thus coupling the worm shaft to the propeller shaft to be driven thereby. On the other hand, the worm shaft may be uncoupled from the propeller shaft with equal facility by simply pulling the rod 28 rearwardly.

Journaled through the casing 17 at substantially right angles to the worm shaft 23 is a jack shaft 31 upon which is fixed within the casing a worm wheel 32 meshing with the worm 24. Rigidly secured to the ends of said shaft exteriorly of the casing are cranks 33 and pivotally connected to the free ends of said cranks are arms 34. At their free ends these arms carry ground engaging shoes 35. As particularly shown in Fig. 2, the shoes are cupped somewhat at their lower sides so as to obtain a firm purchase upon the ground and are provided with sockets 36 in which the outer ends of the arms are freely received to be pivotally connected with the shoes by bolts or other suitable fastening devices extending through the socket walls. Journaled beneath the frame 16 of the truck chassis near the rear end thereof is transverse windlass shaft 37 provided at one end with a crank 38 and fixed to said shaft is a ratchet wheel 39 with which coacts a spring pressed pawl 40. Secured at their upper ends to said shaft are chains or other suitable flexible elements 41 connected at their lower ends one to each of the arms 34 at a point adjacent to the outer end thereof. Consequently, the crank 38 may be operated for winding the chains about the shaft and consequently elevating the free ends of the arms and ground engaging shoes to inactive position.

From the preceding description it is believed that the operation of my improved device will be readily understood. Should a truck become stalled, as for instance by being stuck in the mud or sand, the shoes 35 are first lowered into engagement with the ground. Then, while the propeller shaft 14 is at rest, the coupling sleeve 27 is shifted forwardly for coupling the worm shaft 23 to the propeller shaft. Consequently, when the motive power is subsequently applied to the propeller shaft, the worm shaft 23 will be turned to in turn rotate the cranks 33 when the device will, through the arms 34 and shoes 35, exert a lifting and pushing force tending to move the truck ahead. In this connection, it is to be observed that the worm 24 is relatively steep as compared with the worm upon the propeller shaft 14 so that maximum results may be obtained from the motive power of the truck for extricating the truck. As the shaft 31 is rotated, the shoes 35 will, of course, be alternately advanced forwardly step by step, as the truck moves ahead, so that while one shoe is being thus advanced, the other shoe will receive the thrust for advancing the truck. This advancement of the shoes will, of course, be automatic so that at no time will the truck be allowed to recede after being partially extricated. In some instances, it may, owing to the contour of the ground, be found advantageous to rigidly fix the shoes 35 with respect to the arms 34. Wedges 42 are, as shown in detail in Fig. 4, accordingly provided. These wedges are adapted for engagement in the sockets 36 of the shoes at the rear of the free ends of the arms 34 and, as will be clear, will serve to hold the shoes against pivotal movement upon the arms.

Having thus described the invention, what is claimed as new is:

1. In a motor driven vehicle, the combination of a differential, a propeller shaft coupled at its rear end portion with the differential, a driven shaft extending in alinement with the propeller shaft at its rear end, said shafts being each mounted for rotation in a single plane, means for coupling said shafts, and reciprocable ground engaging means operable by the latter shaft for pushing the vehicle forwardly step by step.

2. In a motor driven vehicle, the combination of a differential, a propeller shaft coupled at its rear end portion with the differential, a driven shaft extending in alinement with the propeller shaft at its rear end, said shafts being each mounted for rotation in a single plane, reciprocable ground engaging means operable by the latter shaft for pushing the vehicle forwardly step by step, and means for coupling said shafts whereby the ground engaging means may be operated coincident with the turning of the drive wheels of the vehicle.

3. In a motor driven vehicle, the combination with a propeller shaft and differential housing, of a housing secured to the differential housing of the vehicle to project rearwardly from the differential housing, a driven shaft mounted in the latter housing to extend in alinement with the propeller shaft, a shaft extending transversely through the latter housing, a driving connection between the driven shaft and said last mentioned shaft, cranks mounted on the end portions of said last mentioned shaft at opposite sides of the latter housing, ground engaging means connected to said cranks, and means for coupling the propeller shaft and said driven shaft.

4. In a motor driven vehicle, the combination of a propeller shaft, a driven shaft, means for coupling said shafts, a crank operable by the latter shaft, an arm pivoted to said crank, a ground engaging shoe pivoted upon the free end of said arm, and means for locking the shoe against pivotal movement upon the arm.

5. In a motor driven vehicle, the combination of a propeller shaft, a driven shaft, means for coupling said shafts, a crank operable by the latter shaft, an arm pivoted to said crank, a ground engaging shoe having a socket receiving the free end of said arm, means pivotally connecting the shoe with the arm, and a wedge engageable in the socket of the shoe for locking the shoe against pivotal movement upon the arm.

In testimony whereof I affix my signature.

FRITUFF CARLSON. [L. S.]